United States Patent [19]

Bradshaw et al.

[11] Patent Number: 5,272,572
[45] Date of Patent: Dec. 21, 1993

[54] APPARATUS AND METHOD FOR USE IN APPENDING DATA TO DATA PREVIOUSLY WRITTEN ON A TAPE IN A HELICAL SCAN TAPE RECORDER SYSTEM

[75] Inventors: Alan D. Bradshaw, Kiowa; Bruce M. Davis, Castle Rock; Herschel P. Hall, Littleton, all of Colo.

[73] Assignee: Alliant Techsystems Inc., Edina, Minn.

[21] Appl. No.: 661,488

[22] Filed: Feb. 26, 1991

[51] Int. Cl.⁵ .................................... G11B 27/02
[52] U.S. Cl. .......................... 360/13; 360/77.15; 360/14.3
[58] Field of Search ........... 360/13, 14.3, 83, 77.15, 360/18, 22, 32, 73.09, 72.1, 72.2, 72.3, 73.09, 77.14, 66, 137, 14.2

[56] References Cited

U.S. PATENT DOCUMENTS

| | | | |
|---|---|---|---|
| 4,819,087 | 4/1989 | Takeuchi et al. | 360/14.3 |
| 4,878,134 | 10/1989 | Masui et al. | 360/13 X |
| 5,084,786 | 1/1992 | Konno et al. | 360/13 |

Primary Examiner—Robert J. Pascal
Assistant Examiner—Ali Neyzari
Attorney, Agent, or Firm—Sheridan Ross & McIntosh

[57] ABSTRACT

An apparatus and method for use in appending data to data that has been previously established on a tape in a helical scan tape recorder that results in the spacing between the appended data and the previously established data being within a defined range. The present invention provides a method for measuring the total delay associated with the write and read circuitry within the recorder and a method and apparatus for using the total delay to initiate the writing of the data to be appended to the previously established data on the tape at the appropriate instant to achieve the desired spacing. An apparatus and method for compensating for inaccuracies in the measured total delay to prevent "creep", i.e., a progressive increase or decrease in the spacing between adjacent data that evidences itself when there are several consecutive appends with the data in each append being established on the record carrier in less than the transient response time of the servo circuitry used to control the relative movement between the device for writing the data on the tape and the tape itself.

24 Claims, 7 Drawing Sheets

APPARATUS AND METHOD FOR USE IN APPENDING DATA TO DATA PREVIOUSLY WRITTEN ON A TAPE IN A HELICAL SCAN TAPE RECORDER SYSTEM

BACKGROUND OF THE INVENTION

1. Field of the Invention

The present invention relates to helical scan tape recorders and, more specifically, to an apparatus and method for appending data to data previously established on the tape in such a recorder so that the spacing between the appended data and the previously established data is within a defined range.

2. Description of the Related Art

The typical helical scan tape recorder includes a tape onto which data can be written or from which data that has been previously written on the tape can be read using a rotating scanner that has one or more read/write (R/W) heads that rotate about the axis of rotation of the scanner. The tape and the R/W heads are positioned with respect to one another such that the plane of rotation of the R/W heads is at an angle to the longitudinal axis of the tape. Associated with both the tape and the scanner are servo devices for controlling the movement of each. More specifically, there is a tape servo, which is hereinafter referred to as the capstan servo, that is used to control the velocity and position of the tape relative to the R/W heads and a scanner servo that controls the rotational velocity of the R/W heads.

To write data on the tape in the typical helical scan recorder, the capstan servo is used to move the tape at a substantial constant velocity relative to the R/W heads and the scanner servo is used to rotate the R/W heads at a substantial constant angular velocity. This and the orientation of the R/W heads results in the R/W heads each traversing a path over the tape that is at an angle to the longitudinal axis of the tape. As a R/W head traverses this path, a track or swipe of data is established on the tape with the track having a center line that is at an angle to the longitudinal axis of the tape. Due to the substantially constant velocity of the tape and the substantially constant angular velocity of the R/W heads, the swipes are laid down on the tape such that the distance between center lines of consecutive swipes, as measured along the longitudinal axis of the tape is, also, substantially constant.

Once data has been established on the tape in the typical helical scan tape recorder, the data can subsequently be read by using the capstan servo to move the tape relative to the R/W heads at a substantially constant velocity and using the scanner servo to rotate the R/W heads at a substantial constant angular velocity as was done during the write operation. However, even though the tape and the scanner are moving at the appropriate velocities, the paths being traversed by the R/W heads over the tape may be parallel, but not aligned, with the center lines of the swipes established on the tape. Stated another way, the tape and the R/W heads may not be in phase with one another. This phase difference can result in failure to accurately read the data established on the tape. To bring the tape and the R/W heads into phase with one another so that the swipes can be read, the velocity of the tape or the rotational velocity of the R/W heads must be momentarily increased or decreased, as the case may be, using either, or both, the capstan servo and the scanner servo. Generally, the capstan servo device is preferred for making phase adjustments over the scanner servo because the relatively small mass of the tape relative to the scanner makes it easier to control the velocity of the tape. Typically, the data error rate, i.e., the errors detected in reading the swipes, serves as a good indicator that the tape and the R/W heads are out of phase with one another and, as a consequence, is typically used in making the appropriate phase adjustment.

Presently, helical scan tape recorders are generally used to record a large volume of data where the data is provided at a particular frequency or rate and typically results in most, if not all, of the usable space on the tape being employed to record the data. In such situations, the write and read operations described above work quite well. However, there are many applications that require considerably less than all or substantially all of the tape in order to record the data presented. An example of such an application is oil field logging where a device associated with an oil well records production data for the oil well over a defined period and then transmits the data to a receiver, generally located in an airplane passing over the oil well, where it is recorded. Typically, the airplane containing the receiver flies over and records the data from the devices associated with several oil wells that are distantly located from one another. Consequently, this application requires that the recording device be activated to record the data from one oil well, deactivated after the data for the one oil well is recorded, and then reactivated to record the data for the next oil well. Presently known helical scan tape recorders are not feasible in such an application because they cannot reliably record data that is not provided at a particular frequency or rate, i.e., interrupted or provided in a non-continuous fashion. More specifically, if the flow of data is not provided at the required rate, then presently known helical scan tape recorders will not establish the required spacing between adjacent swipes. This may, in turn, compromise data integrity. For example, if a swipe is laid down too close to the swipe previously established on the tape, then the data associated with the swipe previously established on the tape may be destroyed. Stated yet a different way, presently known helical scan tape recorders are incapable of what is typically termed an append operation in the mass data storage industry.

Based on the foregoing, the present invention seeks to address the failing of the presently known helical scan tape recorders in not providing the ability to append data.

SUMMARY OF THE INVENTION

The present invention provides an apparatus and method for appending data to data previously established on a tape in a helical scan tape recorder such that the spacing between the data previously established on the tape and the appended data is maintained within a defined range. By maintaining the spacing within a defined range, the loss of data that would result if the spacing were insufficient and, as a result, the appended data was written over the previously established data is avoided. Relatedly, the data capacity of the tape is maintained by preventing too large a spacing between the appended data and the previously established data.

In essence, the desired spacing between appended data and data previously established on the tape is achieved by providing an apparatus and method that initiates the writing of the data to be appended at the appropriate time to achieve the desired spacing. This time is when the device for writing data on the tape and the tape are in a particular positional relationship with respect to one another. This positional relationship is dependent upon identifying the last data previously established on the tape and the velocity of the tape. More specifically, the instant at which the device for writing data and the tape are in the required positional relationship with respect to one another is when the tape has moved the required distance with respect to the device for writing data after the last data previously established on the tape has been identified given the velocity of the tape. Inherent, however, in identifying the last data previously established on the tape is a delay between the time the data is read off the tape and the time the data is detected, which is hereinafter referred to as the read delay. There is also a delay between the time that the writing of data is initiated and the actual establishment of the data on the tape. This delay is hereinafter referred to as the write delay. These delays affect the instant at which the writing of the data to be appended should be initiated and, as a consequence, the required positional relationship between the device for writing data and the tape. More specifically, the read delay affects the positional relationship because the tape has moved with respect to the device for writing between the reading of the last data previously established on the tape and the detection of the data by a distance determined by the velocity of the tape and the read delay. Similarly, the write delay affects the positional relationship because the tape will have moved with respect to the device for writing by a distance determined by the velocity of the tape and the write delay. In order to compensate for these effects, the read and write delay must be determined and used to define the appropriate instant at which to initiate the appending of data to data previously written on the tape.

The present invention provides a method for measuring the write plus read delays, hereinafter referred to as the total delay, and an apparatus and method for using the measured total delay to append data to data previously established on the tape. In one embodiment of the invention, the measured total delay is used to establish a phase delay between a periodic signal that is read from the tape and that provides velocity as well as position information on the tape and a periodic reference signal that is used to initiate the writing of data on the tape. This relationship is established when the data previously established on the tape is being read to position the tape following the last data previously written on the tape so that the new data can be appended. While this phase relationship can be established during the time when the tape is being positioned, it cannot be maintained during the appending of data because there is no information yet established on the tape from which the periodic signal can be derived. The present invention addresses this problem by establishing the required phase delay between the periodic signal derived from the tape and the periodic reference signal during the positioning of the tape and also noting the phase relationship between the periodic reference signal and another periodic signal that is derived from the motor used to move the tape and, hence, representative of the velocity of the tape. Unlike the periodic signal derived from the tape, this periodic reference signal is available during the appending of data. Consequently, by maintaining the phase relationship between the periodic reference signal and the periodic reference signal derived from the motor, the phase relationship between the periodic reference signal and the periodic signal derived from the tape that is necessary for appending data with the appropriate spacing is achieved.

The present invention further recognizes that the measurement of the total delay, even though it is quite accurate, is subject to a degree of error. This error can, if several consecutive append operations are performed in less time than the transient or step response time of the servo system used to control the movement of the tape and the device for writing with respect to one another, result in the velocity of the tape with respect to the device for writing progressively increasing or decreasing. This, in turn, results in the spacing between data increasing or decreasing, i.e., "creeping". To substantially reduce "creeping", the present invention provides an apparatus and method for monitoring the velocity of the tape relative to the device for writing prior to the appending of data and making, if necessary, the appropriate adjustment to prevent creeping. In one embodiment of the invention, the actual velocity of the tape or device for writing is monitored and if it is above a nominal velocity, it is reduced by a defined amount. Conversely, if the velocity is below the nominal velocity, the velocity is increased. This results in keeping the velocity at or near the nominal velocity and, as a result, prevents "creeping".

The method for measuring the total delay is based upon the recognition that the relationship between the total delay used in appending data and the change in velocity of the tape with respect to the device for writing is linear. As discussed with respect to the "creeping" phenomena, if the total delay used during append operation is not equal to the actual total delay, the velocity of the tape with respect to the device for writing can increase or decrease and, as a result, the spacing between consecutive data can increase or decrease also. In essence, the method used to measure the total delay determines this linear relationship and determines the delay at which the velocity of the tape remains substantially constant and, as a consequence, the spacing between adjacent data also remains constant. In one embodiment of the method, the linear relationship is determined by determining two points on the line representing the linear relationship. More specifically, a first plurality of consecutive append operations are performed with a first delay and a second plurality of consecutive append operations are performed with a second delay where each of the append operations occur in less time than the transient response time of the servo system. At least one of the first and second plurality of consecutive append operations should result in "creep". Following the establishment of the data on the tape, the data is read and, while the data is being read, the velocity of the tape is monitored. At least one of the delays used in the first or second plurality of consecutive append operations should result in an increase or decrease in the velocity of the tape with respect to the device for writing being observed, i.e., creeping. Using the two delays in combination with the observed changes in velocities, the linear relationship can be derived. Once this relationship is determined, it is then used to determine the delay at which substantially zero change in velocity of the tape relative to the device for writing occurs. This is the measured total delay used in the append operation.

Based on the foregoing, the present invention provides an apparatus and method that allows data to be appended to data previously established on the tape in a helical scan tape recorder. Among the advantages provided by the present invention is that it assures that appended data does not over write data previously established on the tape by maintaining a defined spatial relationship between the appended data and the data previously established on the tape. Relatedly, by maintaining this defined spatial relationship, the data capacity of the tape is also maintained by not allowing space between adjacent data to exceed a defined limit. Moreover, the present invention preserves or maintains the necessary spacing between adjacent data even if there are a plurality of consecutive append operations when each append operation occurs in less time than the step response of the servo system such as might occur in an oil well logging application. Furthermore, the goals of the present invention can be achieved with relatively inexpensive modifications to present helical scan systems.

DESCRIPTION OF THE PREFERRED EMBODIMENTS

Figure 1:
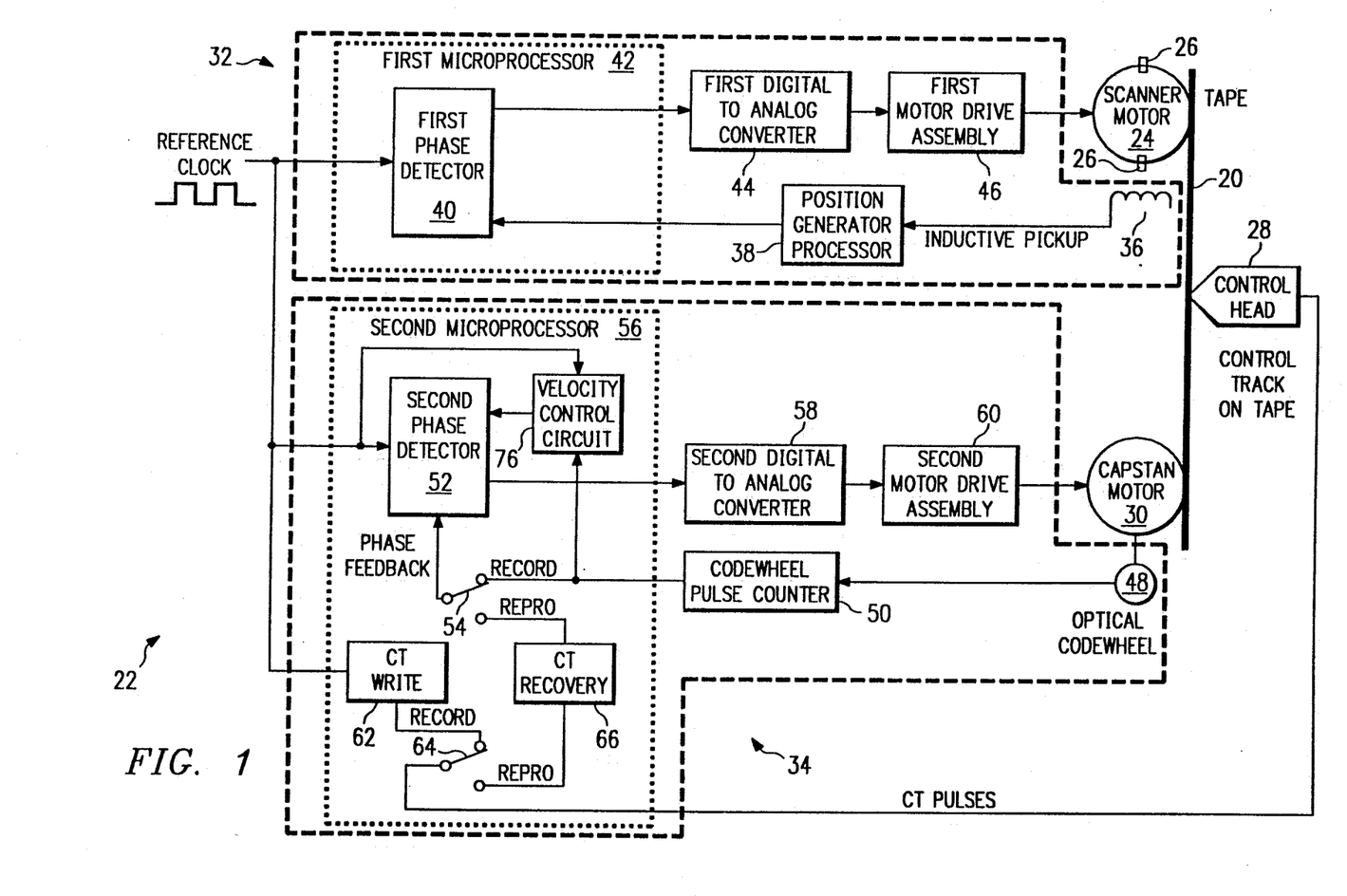
FIG. 1 illustrates one type of helical scan tape recorder system that embodies the present invention.

FIG. 1 illustrates a tape 20 and an apparatus 22 for use in writing data onto the tape 20 and reading data that has been previously written on the tape 20 in one type of helical scan tape recorder. The apparatus 22 includes a scanner motor 24 for rotating a pair of read/write (R/W) heads 26 that are used to write swipes of data on the tape 20 and read swipes of data previously written on the tape 20. The apparatus 22 also includes a control head 28 that is used to write a control track on the tape 20 and read a control track that has been previously established on the tape 20. The apparatus 22 further includes a capstan motor 30 that is used to move the tape 20 with respect to the pair of R/W heads 26 and the control head 28.

To control the rotation of the scanner motor 24 and, as a consequence, the rotation of the pair of R/W heads 26, the apparatus 22 includes a scanner servo 32 that establishes and maintains the rotational velocity of the scanner motor 24 at a nominal rotational velocity during write and read operations. Similarly, a capstan servo 34 maintains the linear velocity of the tape 20 at a nominal linear velocity v relative to the pair of R/W heads 26 and the control head 28 during read and write operations by controlling the rotational velocity of the capstan motor 30. To coordinate the rotational velocity of the pair of R/W heads 26 with the linear velocity of the tape 20, a reference clock signal is provided to both the scanner servo 32 and the capstan servo 34. The frequency of the reference clock corresponds to the frequency of rotation of the scanner motor 26 and the capstan motor 30.

The scanner servo 32 includes an inductive pick up coil 36 that generates an analog pulse upon the passage of each of the pair of R/W heads 26. The analog pulses produced by the inductive pick-up coil 36 are applied to a position generator processor 38 that converts the analog pulses into digital pulses and divides the frequency of the resulting digital pulse train by two to produce a signal having the same frequency as the reference clock signal. The signal produced by the position generator processor 38 is applied to a first phase detector 40 located within a first digital microprocessor 42. The first phase detector 40 generates a first digital error signal that is representative of any phase difference between the signal produced by the position generator processor 38 and the reference clock signal that is outside the desired phase relationship defined by the first digital microprocessor 42. Any undesired phase difference between the signal produced by the position generator processor 38 and the reference clock signal is due to either the scanner motor 24 having a rotational velocity that is different from the nominal rotational velocity $\omega$ or the scanner motor 24 is rotating at substantially the nominal rotational velocity $\omega$ but its rotational position is not in the desired phase relationship with respect to the reference clock signal. The first digital error signal produced by the first phase detector 40 is applied to a first digital-to-analog (D/A) converter 44 that converts the first digital error signal into a first analog error signal that is applied to a first motor drive assembly 46. The first motor drive assembly 46 uses the first analog error signal to adjust the rotational velocity of the scanner motor 24 such that it tends toward the nominal rotational velocity $\omega$ and toward the desired rotational position with respect to the reference clock signal, i.e. is in the desired phase relationship with respect to the reference clock.

The capstan servo 34, unlike the scanner servo 32, utilizes different components depending upon whether a write or read operation is being performed. Consequently, the capstan servo 34 is described first with respect to the components that are utilized during a write operation and second with respect to the components used during a read operation.

During a write operation, the capstan servo 34 employs an optical codewheel 48 for generating a periodic analog signal that is indicative of the rotational velocity of the capstan motor 30 and, as a consequence, the linear velocity of the magnetic tape 20. The periodic analog signal produced by the optical codewheel 48 is applied to a codewheel pulse counter 50 that produces a digital signal, hereinafter referred to as the PG signal, that is applied to a second phase detector 52 via a first switch 54, both of which are embodied within a second digital microprocessor 56. The second phase detector 52 generates a second digital error signal that is indicative of any phase difference between the PG signal and the reference clock signal that is outside the desired phase relationship defined by the second digital microprocessor 56. In this case, the second digital error signal is due to either the magnetic tape 20 having a linear velocity other than the nominal linear velocity v or the position of the tape 20 is not in the desired phase relationship with respect to the reference clock. The second digital error signal produced by the second phase detector 52 is applied to a second D/A converter 58 that converts the second digital error signal into a second analog error signal that is applied to a second drive motor assembly 60. The second drive motor assembly 60 uses the second analog error signal to adjust the rotational velocity of the capstan motor 30 and, hence, the linear velocity of the magnetic tape 20 such that the linear velocity of the magnetic tape 20 approaches the nominal linear velocity v and the position of the magnetic tape 20 tends toward the desired phase relationship with the reference clock signal. During the write operation, the capstan servo 34 also utilizes a control track (CT) write circuit 62, which is also embodied within the second digital microprocessor 56, to write a control track on the magnetic tape 20 that is used by the capstan servo 34 during reading of data on the magnetic tape 20 to control the linear velocity of the magnetic tape 20. To write the control track, the second digital microprocessor 56 actuates a second switch 64, which is also embodied within the second digital microprocessor 56, to connect the CT write circuit 62 to the control head 28. The CT write circuit 62 then initiates the writing of a control track pulse on the magnetic tape 20 on each of the negative going edges of the reference clock. It should be appreciated that other points in the cycle of 8 the reference clock could be used to initiate the writing of control track pulses.

During the read operation, the capstan servo 34 uses the first switch 54 and the second switch 64 to disconnect the codewheel pulse counter 50 from the second phase detector 52 and the CT write circuit 62 from the control head 28, respectively, and connect a control track (CT) recover circuit 66 between the control head 28 and the second phase detector 52. The control head 28 produces an analog pulse upon the passage of a control track pulse. The CT recovery circuit 66 converts the analog pulses produced by the control head 28 into a digital control track signal that is applied to the second phase detector 52. The second phase detector 52, in turn, generates a second digital error signal that is representative of any undesired phase difference between the digital control track signal that is produced at the output of the CT recovery circuit 66, which is hereinafter referred to as the recovered control track pulse signal, and the reference clock signal. The frequency of the recovered control track pulse signal is representative of the linear velocity of the tape 20. Consequently, any undesired phase difference indicates either that the linear velocity of the tape 20 is not substantially equal to the nominal linear velocity v or that the position of the tape 20 is not in the desired phase relationship with the reference signal.

Operational information, such as whether a write, read, or append operation is to be performed, is provided to the first digital microprocessor 42 and the second digital microprocessor 56 by a controller (not shown).

Figure 2:
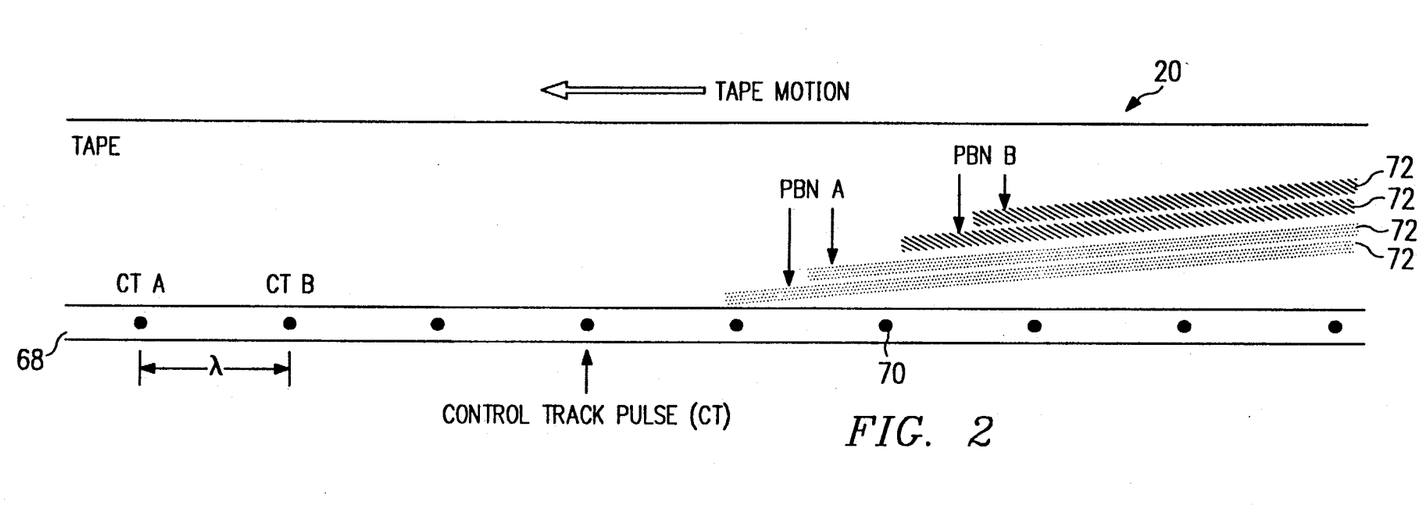
FIG. 2 illustrates the swipes and control track that can be written on the tape using the helical scan tape recorder system illustrated on FIG. 1.

With reference to FIG. 2 and continuing reference to FIG. 1, the write and read operations are described in greater detail. Assuming that the tape 20 is initially stationary, the write operation involves bringing the linear velocity of the tape 20 up to the nominal velocity v and maintaining the linear velocity of the tape 20 at the nominal velocity v using the capstan motor 30 and the associated capstan servo 34. More specifically, during a write operation, the second microprocessor 56 connects the codewheel pulse counter 50 to the second phase detector 52. In response, the second phase detector 52 produces the second digital error signal, which is indicative of any undesired phase difference between the reference clock signal and the PG signal output by the pulse counter 50. The second digital error signal output by the second phase detector 52 indicates either that the magnetic tape 20 is not yet being moved by the capstan motor 30 at the nominal velocity v or, if the magnetic tape 20 is being moved by the capstan motor 30 at the nominal velocity v, then the position of the magnetic tape 20 is not in the desired phase relationship with respect to the reference clock. In either case, the second D/A converter 58 and the second motor drive assembly 60 respond to the second digital error signal by adjusting the rotational velocity of the capstan motor 30, and hence, the linear velocity of the magnetic tape 20 so that the linear velocity of the magnetic tape 20 approaches the nominal linear velocity v and the magnetic tape 20 has the desired phase relationship with the reference clock.

During the write operation, the capstan servo circuitry 34 also writes a control track 68 on the magnetic tape 20. More specifically, the second microprocessor 56 connects the control head 28 to the CT write circuit 62 using the second switch 64. The CT write circuit 62, upon detecting the negative edge of the reference clock signal, initiates the writing of a control track pulse 70 on the magnetic tape 20 by the control head 28. Providing the magnetic tape is being moved at the nominal velocity v, the distance between consecutive control track pulses 70 is a nominal distance $\lambda$.

Also during the write operation, the scanner motor 24 is brought up to and maintained at the nominal rotational velocity $\omega$ by the scanner servo 32. As previously stated, the position generator processor 38 generates a first digital signal that is representative of the rotational velocity of the scanner motor 24 and, hence, the rotational velocity of the pair of R/W heads 26. The first phase detector 40 generates a first digital error signal that is representative of the phase difference between the reference clock signal and the first digital signal output by the position generator processor 38. The first digital error signal output by the first phase detector 40 indicates either that the rotational velocity of the scanner motor 24 is not yet up to the nominal rotational velocity v or if the rotational velocity of the scanner motor is at the nominal rotational velocity v, then the rotational position of the scanner motor 24 is not in the desired phase relationship with the reference clock signal. In either case, the first D/A converter 44 and the first motor drive assembly 46 respond to the first digital error signal output by the phase detector 40 by adjusting the rotational speed of the scanner motor 24 such that it approaches the nominal rotational velocity and the tape 20 has the desired rotational position with respect to the reference clock signal. The relationship between the nominal rotational velocity v of the scanner motor 24 and the reference clock, as previously mentioned, is such that the scanner motor 24 makes one revolution for each cycle of the reference clock signal. This results in each of the pair of R/W heads 26 traversing the tape 20 during a cycle of the reference clock and, as a consequence, laying down a track or swipe of data 72. Providing the magnetic tape 20 is moving at the nominal linear velocity v and the scanner motor is rotating at the nominal rotational velocity ω, the swipes 72 laid down by the pair of R/W heads 26 are separated from one another by a nominal distance as measured along the longitudinal axis of the tape 20.

Consequently, during the write operation, one control track pulse and two of the swipes 72 are laid down on the magnetic tape 20 every cycle of the reference clock signal. More importantly, however, since the laying down of swipes 72 and the control track pulses 70 both occur as a result of a defined and substantially fixed phase relationships with the reference clock, a nominal spacing is achieved between consecutive swipes 72 as well as between consecutive control track pulses 70. The spacing between swipes 72 is quite important. If the spacing is greater than the nominal spacing, then the data capacity of the tape is reduced. On the other hand, if the spacing between is less than the nominal spacing, then the data associated with one of the swipes 72 may over write and, as a consequence, destroy the data associated with the swipe 72 that had been previously laid down. Moreover, if the spacing is greater or less than the nominal spacing, the capstan servo 34 may not be able to operate and, as a consequence, data written on the tape 20 with inappropriate spacing may not be able to be recovered.

Since the laying down of swipes 72 and the control track pulses 70 both occur as a result of a defined and substantially fixed phase relationships with the reference clock, maintenance of the nominal spacing between control track pulses 70 necessarily results in the required nominal spacing being achieved between the swipes 72. Due to this relationship, it is only necessary to discuss the spacing between the control track pulses 70 or the swipes 72 when the appending of data is discussed hereinafter, since whatever affects the spacing between control track pulses 70 will necessarily affect the spacing between swipes 72 and vice versa. Consequently, the following discussion will be limited to discussing the spacing between control track pulses 70 with the understanding that whatever affects the spacing of the control track pulses 70 from one another will also affect the spacing between swipes 72.

During the read operation, the capstan motor 30 and the capstan servo 34 again cooperate to bring the linear velocity of the tape 20 up to the nominal linear velocity v and maintain the linear velocity of the tape 20 at the nominal linear velocity v. In contrast, however, to the operation of the capstan servo 34 during the write operation, the second phase detector 52 generates the second digital error signal based upon any undesired phase difference between the reference clock signal and the recovered control track pulse signal resulting from reading the control track pulses 70 established on the control track 68 during the write operation. The recovered control track pulse signal is applied to the second phase detector 52 by actuating the first switch 54 and the second switch 64 such that the analog pulses produced by the control head 28 upon reading the control track 68 is applied to the CT recovery circuit 66 and then the second phase detector 52. The capstan servo 34 operates, as in the write operation, to maintain the velocity of the tape at the nominal velocity v.

Figure 3A:
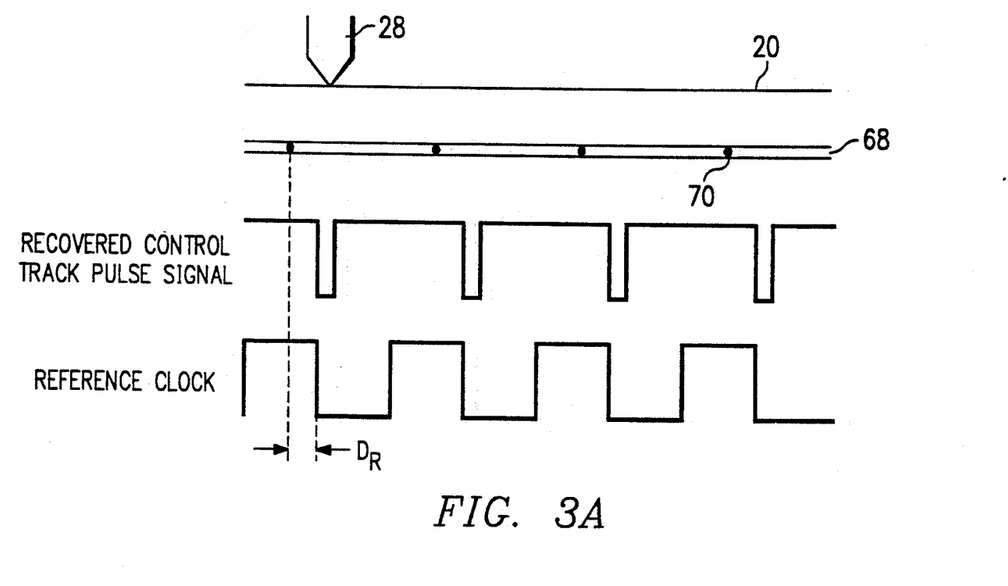
FIG. 3A illustrates the effect of not compensating for the delay associated with the read circuitry on the position of the control head with respect to a control track pulse in the helical scan tape recorder illustrated in FIG. 1.
Figure 3B:
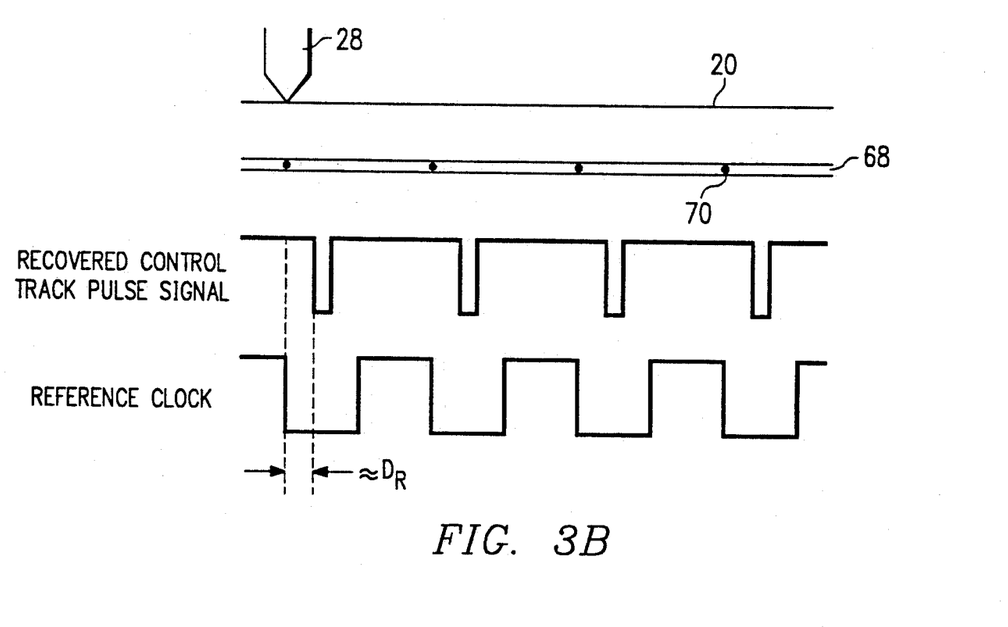
FIG. 3B illustrates the effect of compensating for the delay associated with the read circuitry on the position of the control head with respect to a control track pulse in the helical scan tape recorder illustrated in FIG. 1.

More importantly, however, the capstan servo 34 operates during the read operation to insure that the control head 28 is positioned over a control pulse 70 on the control track 68 at the negative going edge of the reference clock signal which, in turn, assures that the pair of R/W heads 26 are aligned with the swipes 72 established on the magnetic tape 20. In order to assure that the control head 28 is positioned over a control track pulse 74 at the negative edge of the reference clock signal, the capstan servo 34 must compensate for the delay between the time that a control track pulse 70 is read by the control head 28 and the time that the recovered control track pulse produced by the CT recovery circuit 66 is applied to the second phase detector 52. If the capstan servo 34 does not compensate for this delay, which is hereinafter referred to as the read delay $D_R$, then the control head 28 will not be properly positioned over a control track pulse 70 at the negative edge of the reference clock signal as illustrated in FIG. 3A. Consequently, the second microprocessor 56 programs the second phase detector 52 to maintain a phase difference between the recovered control track pulse signal and the reference clock signal that is roughly equal to the read delay. This results, as shown in FIG. 3B, in the control head 28 being roughly positioned over a control track pulse at the negative going edge of the reference clock signal. Moreover, this insures that the pair of R/W heads 26 are roughly aligned over the swipes 76 established on the magnetic tape 20. In the typical helical scan tape recorder, the phase difference maintained by the second phase detector 52 during the read operation is adjusted based upon the error rate of the data read by the pair of R/W heads 26 which is detected by a device (not shown) and communicated to the second digital microprocessor 56.

Figure 4:
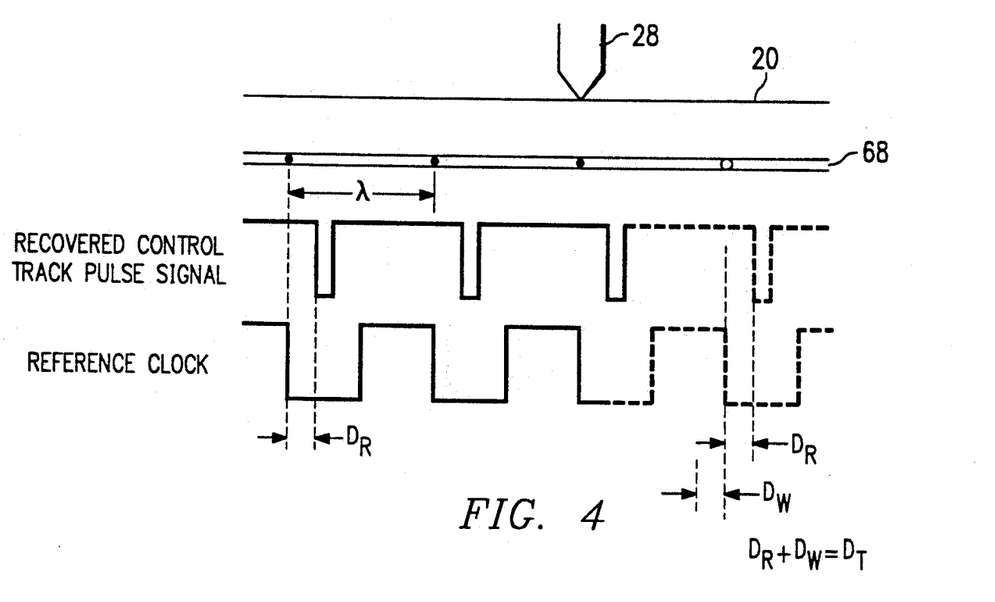
FIG. 4 illustrates the problem with presently known helical scan tape recorders in appending data to previously written data on the tape.
Figure 5:
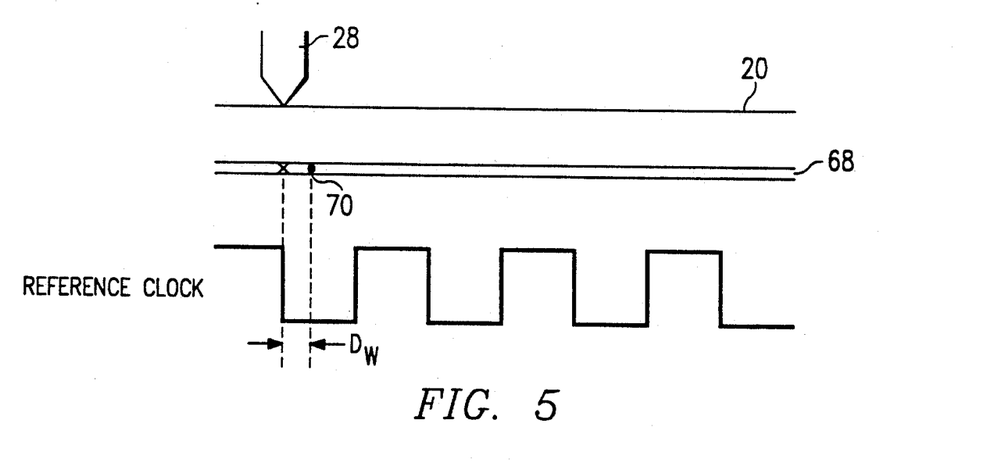
FIG. 5 illustrates the effect of delay associated with the write circuitry on the location of the control track pulse in the helical scan tape recorder illustrated in FIG. 1.

With reference to FIG. 4, the problem addressed in appending data to data previously written on the magnetic tape 20 is illustrated. The append operation involves a reading portion where at least a portion of the data previously written on the magnetic tape 20 is traversed to establish the control head 28 and the pair of R/W heads 26 at the point 74 just following the last of the data previously written on the tape 20, which is hereinafter referred to as the launch point 74, and a writing portion where the new data is appended to the data previously written on the tape 20. The last of the data previously written on the tape 20 is typically identified by address information embedded within the swipe data. If the capstan servo 34 is operating as previously described with respect to the read operation during the reading portion of the append operation, then a phase difference between the recovered control track pulse signal and the reference clock signal is maintained by the second phase detector 52 that roughly compensates for the read delay associated with the control head 28 and the CT recovery circuit 66. If the writing of a control track pulse were initiated at the negative going edge of the reference clock signal, as in the normal write operation, with the phase relationship established by the normal read operation, the resulting control track pulse 70 established on the tape 20 would not be spaced from the preceding control track pulse 70 by the nominal distance λ due to the delay between the initiation of the writing control track pulse and the actual writing of the control track pulse on the tape 20. This delay, which is attributable to the CT write circuit 62 and the control head 28, is hereinafter referred to as the write delay $D_W$ and is illustrated in FIG. 5. Based on the foregoing, it is apparent that the normal write and read operations cannot be used to accomplish an append operation.

The present invention addresses this problem by measuring the sum of the write delay $D_W$ and the read delay $D_R$, which is hereinafter referred to as the total delay $D_T$, with a relatively high degree of accuracy and using the total delay to append new data to data previously established on the tape 20 such that spacing of the new data from the data previously written on the tape 20 approaches the nominal spacing. It is believed that the method of measuring the total delay is best understood after its use in accomplishing an append operation is described. Consequently, the append operation will be described assuming that the total delay $D_T$ is available.

Figure 6:
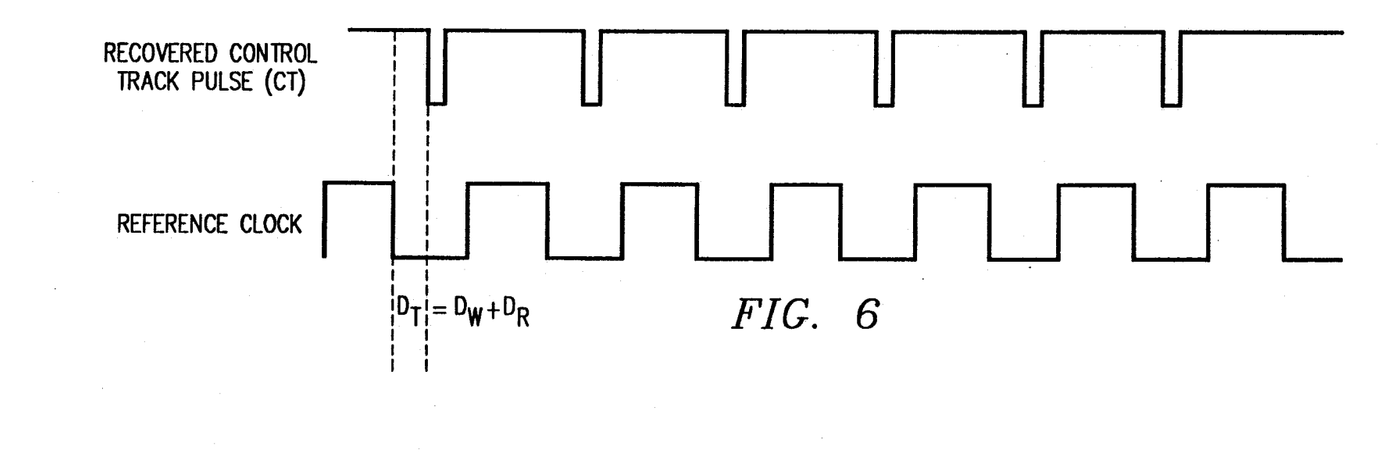
FIG. 6 illustrates the establishment of a phase lag between the recovered control track pulse and reference clock that closely approximates the total delay of the write circuitry and the read circuitry and that is used in appending data to data previously written on the tape in the helical scan tape recorder illustrated in FIG. 1.

With reference to FIG. 6, the present invention accomplishes an append operation by using the second phase detector 52 to maintain a phase difference between the recovered control track pulse signal and the reference clock signal during the reading portion of the append operation that is substantially equal to the total delay $D_T$. This, in turn, results in the negative going edge of the reference clock signal defining the instant at which the writing of a control track pulse should be initiated in order to insure that the resulting control track pulse 70 established on the control track is separated by the nominal distance λ from the previously established control track pulse 70 on the control track 68.

Figure 7:
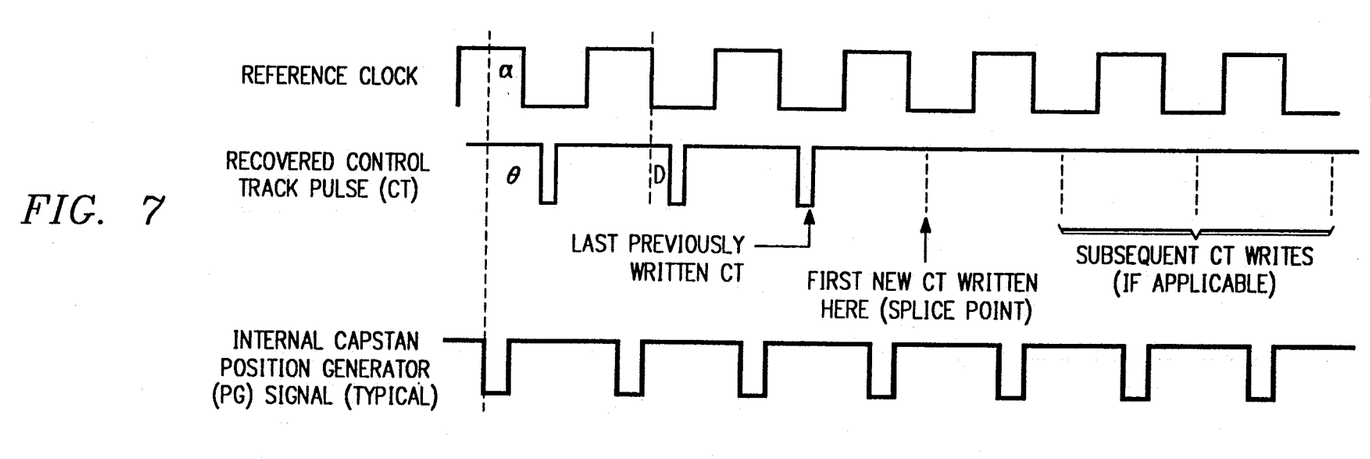
FIG. 7 illustrates the relationship between the reference clock, the recovered control track pulse, and the position generator (PG) signal associated with the capstan motor during an append operation.

However, while the required phase difference can be maintained during the reading portion of an append operation, it cannot be maintained during the writing portion of the append operation because a control track pulse does not yet exist on the magnetic tape 20 from which a recovered control track pulse can be produced and used to maintain the required phase difference with the reference clock signal, i.e., the total delay $D_T$. Nonetheless, the second phase detector 52 must maintain the required phase difference during the write portion of the append operation in order to append the new control track pulses to the control track pulses previously written on the tape 20 such that the spacing between the new control track pulses and the control track pulses previously written on the tape 20 approaches the nominal spacing λ. As illustrated in FIG. 7, the present invention addresses this problem by monitoring the phase difference α between the PG signal output by the codewheel pulse counter 50 and the reference clock signal during the reading portion of the append operation and maintaining this phase difference during the writing portion of the append operation. This preserves the required phase relationship because the recovered control track pulse signal and the PG signal present during the reading portion of the append operation both have a fixed phase relationship with respect to the reference clock signal. Consequently, by maintaining the phase relationship between the PG signal and the reference clock signal during the writing portion of the append operation that was established during the reading portion of the append operation, it is assured that the recovered control track pulse signal obtained upon reading the appended control track pulses will have substantially the same phase relationship to the reference clock signal as the recovered control track pulse signal associated with the control track pulses previously written on the tape 20 have with the reference clock signal. This, in turn, means that the appended control track pulse signals 70 are spaced from the control track signal pulse previously written on the tape 20 at substantially the nominal spacing λ.

Presently, the total delay $D_T$ can only be accurately measured to within 5% of the actual total delay. Consequently, implementing the previously described append operation may result in the spacing between the first appended control track pulse and the last control track pulse previously written on the tape 20 being slightly greater than or slightly less than the nominal spacing λ. This discrepancy in the spacing of the control track pulses, although slight, will result in the capstan servo 34 increasing or decreasing the rotation velocity of the capstan motor 30 and, as a consequence, increasing or decreasing the linear velocity of the tape 20. More specifically, the discrepancy in spacing will, upon the reading of control track 68, manifest itself as a phase error between the reference clock signal and the recovered control track pulse signal that will result in the linear velocity of the tape 20 being adjusted to reduce the phase error. Following the adjustment, the capstan servo 34 causes the linear velocity of the tape 20 to return to the nominal linear velocity v within the transient or step response time of the capstan servo 34. If an append operation occurs during the transient response time, i.e. while the linear velocity of the tape 20 has been adjusted to compensate for a spacing discrepancy, the spacing between the last control track pulse and the first appended control track pulse will either increase or decrease depending on the adjustment in the linear velocity of the tape 20 made by capstan servo 34. If there are several consecutive append operations with each occurring in less than the transient response time of the capstan servo 34, then the spacing discrepancy between the control track pulses associated with the consecutive appends will accumulate and result in the spacing between consecutive control track pulses increasing or decreasing with respect to the nominal spacing λ, i.e. "creeping".

Figure 8A:
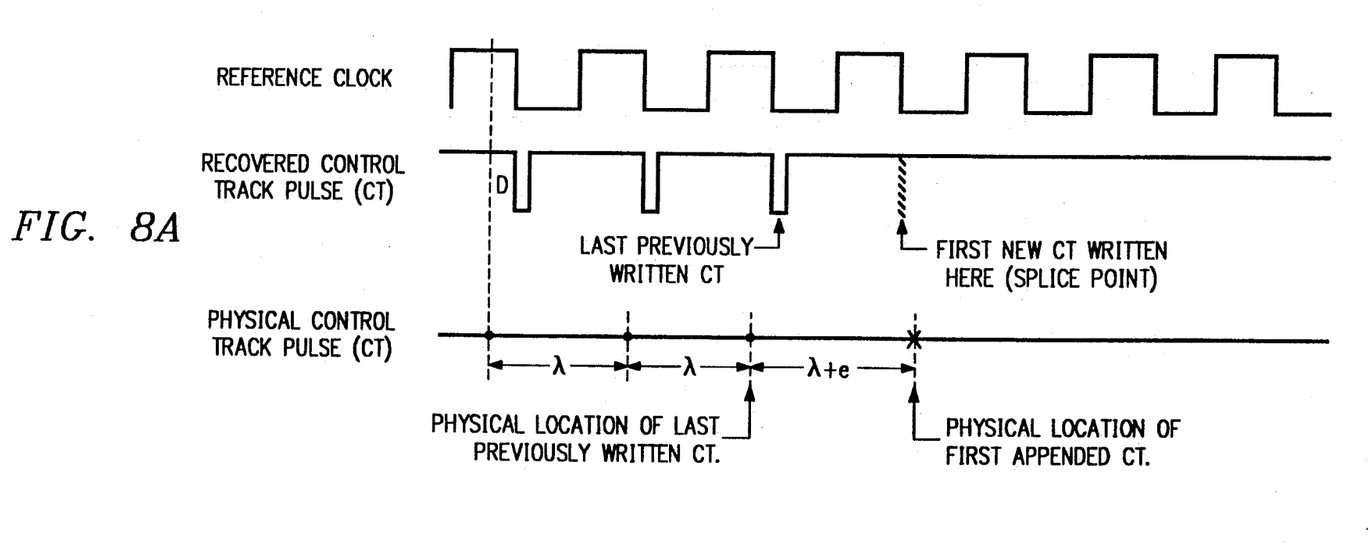
FIGS. 8A-8B illustrate the "creep" effect associated with multiple, consecutive appends where the writing of data on the tape during each append is accomplished in less time than the transient response time of the capstan servo and the delay between the control track pulse and the reference clock is not substantially equal to the sum of the write delay and the read delay.
Figure 8B:
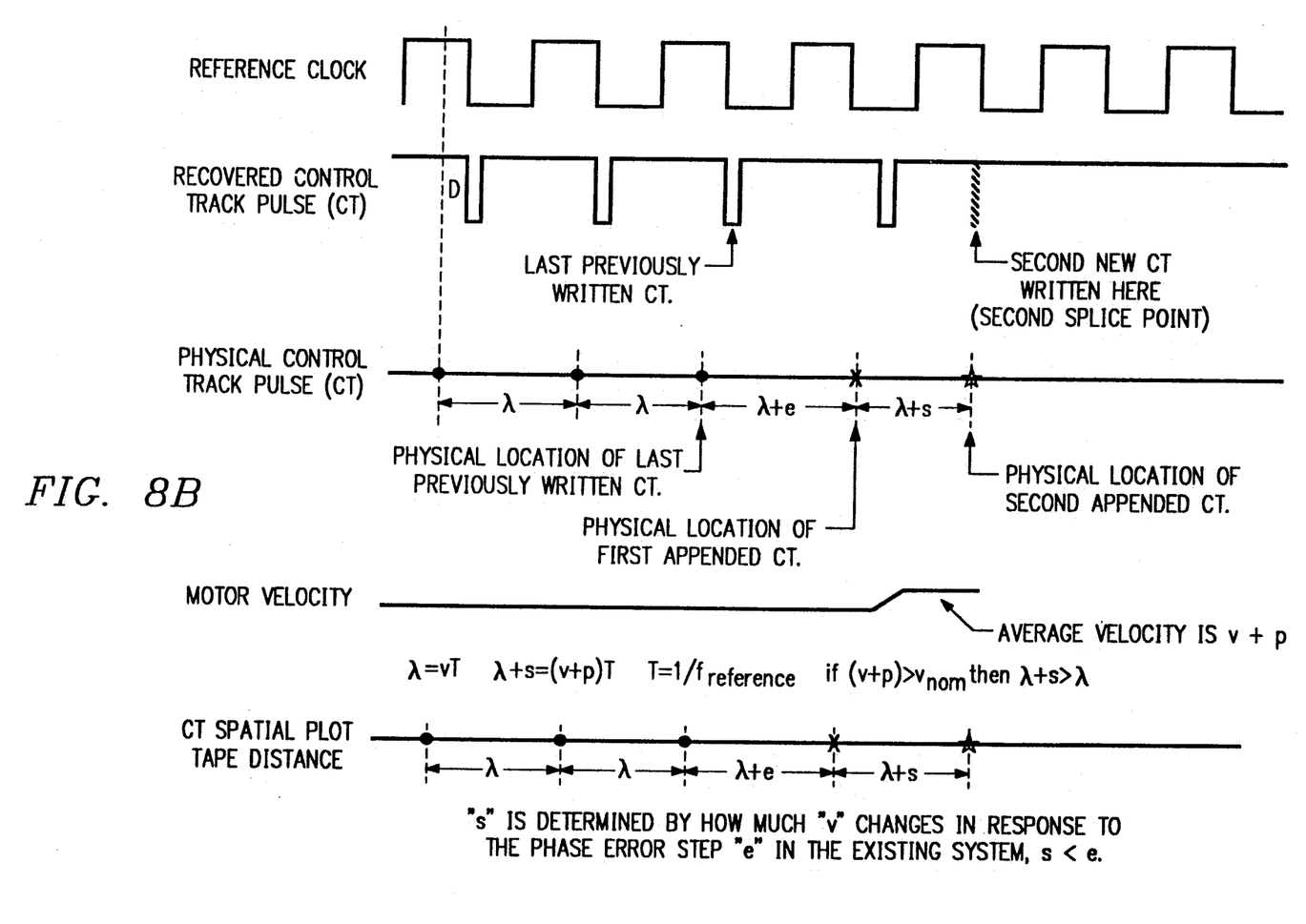

An example of the "creeping" problem is illustrated in FIGS. 8A and 8B where the total delay $D_T$, which is modeled for simplicity as a read delay, has not been established between the recovered control track pulse signal and the reference clock signal. FIG. 8A illustrates the appending of a single control track pulse that occurs in less time than the transient response time of the capstan servo 34. As illustrated, failure to establish the appropriate phase relationship between the recovered control track pulse signal and the reference signal during the reading portion of the append operation and failure to maintain this relationship during the writing portion of the append operation results in a spacing error "e" between the single appended control track pulse and the preceding control track pulse. Consequently, during the reading portion of the subsequent appending of a single control track pulse illustrated in FIG. 8B, the capstan servo 34 reacts to the spacing error "e" by increasing the linear velocity of the tape 20 by an amount $\rho$. This, in turn, results in the spacing between the appended control track pulse and the last control track pulse established on the tape 20 having a spacing error of "s". Now, when a subsequent append operation is performed, the capstan servo 34 reacts to the spacing error "e" by increasing the linear velocity of the tape 20 by an amount $\rho$ and reacts to the spacing error "s" by further increasing the velocity by the amount $\rho$. Consequently, for single append operations where each append occurs in less than the transient response time of the capstan servo 34, the capstan servo 34 reacts by constantly increasing the linear velocity of the magnetic tape 20. This, in turn, results in the spacing between control track pulses increasing. While this particular example illustrated increasing control track spacing, decreasing control track spacing is also possible with the appropriate delay between the recovered control track pulse and the reference clock.

To address the "creep" problem, the capstan servo 34 includes a velocity control circuit 76 that determines if the spacing of the control track pulses is "creeping" and takes the appropriate action to counteract the "creeping". More specifically, the velocity control circuit 76 determines if the spacing of the control track pulses is "creeping" by monitoring linear velocity of the tape 20 during the reading portion of an append operation. If the linear velocity of the tape 20 is increasing, then the spacing between consecutive control track pulses is increasing. Conversely, if the linear velocity of the tape 20 is decreasing, then the spacing between consecutive control track pulses is decreasing. The velocity control circuit 76 monitors the linear velocity of the tape 20 by monitoring the number of pulses output by the codewheel pulse counter 50 per cycle of the reference clock signal. If the number of pulses output by the codewheel pulse counter 50 is increasing per cycle of the reference clock, then the linear velocity of the tape 20 is increasing and the spacing between consecutive control track pulses is likewise increasing. This, in turn, indicates that the total delay $D_T$ being used is too short. If, on the other hand, the number of pulses output by the codewheel pulse counter 50 is decreasing per cycle of the reference clock, then the linear velocity of the tape 20 is decreasing and the spacing between consecutive control track pulses is likewise decreasing. This, in turn, indicates that the total delay $D_T$ being used is too long. If the linear velocity of the tape 20 detected by the velocity control circuit 76 is above or below the nominal velocity v for the tape, then velocity control circuit 76 adjusts the linear velocity of the tape 20 at the launch point 74 so that it tends toward the nominal linear velocity v by adjusting the rotational velocity of the capstan motor 30. More specifically, the velocity control circuit 76 compares the actual linear velocity of the tape 20 to the nominal linear velocity and, if the actual linear is above or below the nominal linear velocity by more than a defined amount, decreases or increases the value of $D_T'$. Consequently, the velocity control circuit causes the total delay used by the second phase detector 52 to alternate, if necessary, between $D_T+D_T'$ and $D_T-D_T'$ and, as a result, the linear velocity of the tape 20 to have an average linear velocity that approaches the nominal linear velocity v. This results in the average spacing between consecutive control track pulses being driven towards the nominal spacing $\lambda$ and thereby compensates for the inaccuracy in the total delay $D_T$ being used for the append operation.

Figure 9:
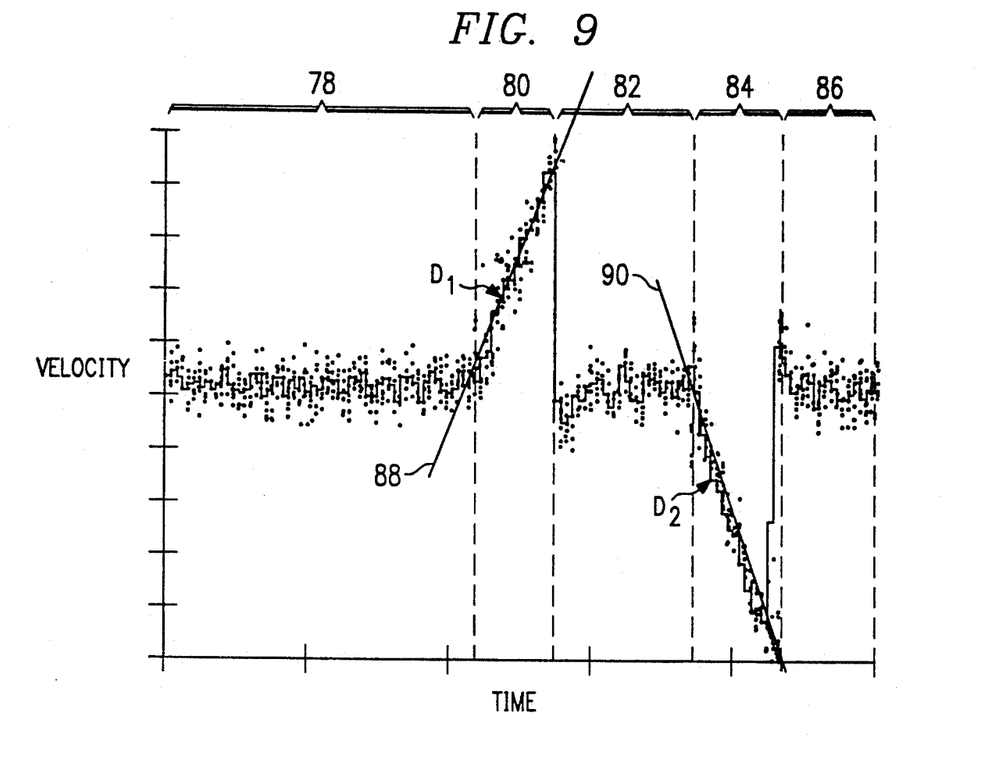
FIG. 9 is a plot of the data produced when using the method of the present invention to determine the total delay associated with the write and read circuitry of the helical scan tape recorder illustrated in FIG. 1.
Figure 10:
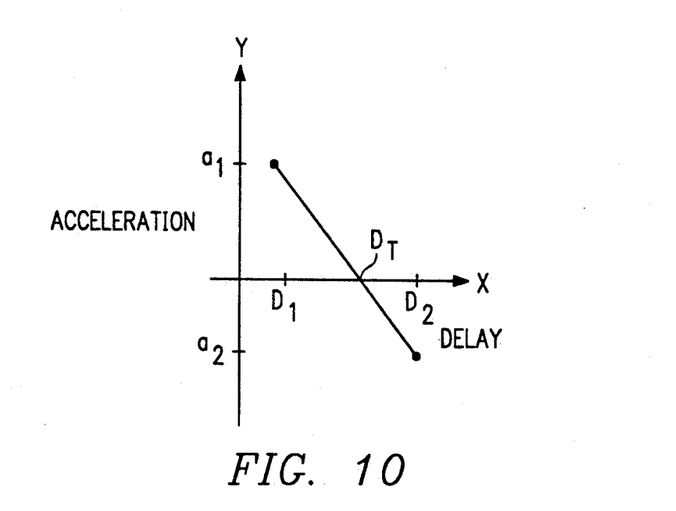
FIG. 10 illustrates the use of the data shown in FIG. 9 to provide an estimate of the total delay.

With reference to FIGS. 9 and 10, the method used to determine the total delay $D_T$ is described. As previously shown, if the total delay used to append data is not substantially equal to the actual total delay, then the spacing between an appended control track pulse and a control track pulse previously written the tape 20 will increase or decrease, i.e., "creep", providing the appended control track pulses are established on the tape 20 in less than the transient or step response time. The capstan servo 34 reacts to this change in the spacing of the control track pulses by increasing or decreasing the velocity, i.e., accelerating or decelerating, the tape 20 in the absence of the velocity control circuit 76 of the present invention. For practical purposes, the relationship between the total delay used in appending data and the resulting change in velocity of the tape 20 upon reading the appended data is linear. The present invention, in essence, determines this linear relationship and based on this linear relationship determines the delay at which substantially zero change in velocity will result upon reading the appended data. This delay is then used as the total delay $D_T$ during append operations. More specifically, the method presently used to determine the aforementioned linear relationship involves determining two points on the line and using these two points to determine the equation of the line representing the linear relationship. The equation of the line is then solved to determine the delay at which substantially zero change in the velocity of the tape 20 will result, i.e., the total delay $D_T$.

An example of the method used to determine the total delay $D_T$ is illustrated in FIGS. 9 and 10. Initially, a rough estimate of the total delay is obtained by averaging the spacing between an appended control track pulse and a control track pulse at the end of a format section for a number of appends using an initial value for the total delay. The format section is the initial data that is established on the tape 20 prior to any user data and is used for initializing the servo circuitry and like of the helical scan tape recorder. Based on the deviation of the measured spacing from the nominal spacing, the total delay used in the append operation is adjusted and the averaging process is repeated. Adjustment of the total delay used in the append operation is repeated until the measured average spacing is substantially equal to the nominal spacing. The total delay being used when the measured average spacing is substantially equal to the nominal spacing is a rough estimate of $D_T$.

Following the rough estimate of the total delay $D_T$, a first plurality of consecutive single append operations are performed beginning after the format section with a total delay that is less than the rough estimate. It is expected that the spacing between consecutive control track pulses 70 will progressively increase during the first plurality of consecutive append operations. After performing the first plurality of consecutive single appends using a delay that is less than the rough estimate, a typical write operation is performed where a number of consecutive control track pulses 70 are established on the tape 20 to allow the capstan servo 34 enough time to recover from the first plurality of consecutive single append operations. Stated another way, a write operation is performed following the first plurality of consecutive single append operations that has a duration greater than the transient response time of the capstan servo 34 to allow the capstan servo 34 enough time to recover from the append operations. Following the write operation, a second plurality of consecutive single append operations are performed using a total delay that is greater than the rough estimate. In contrast to the first plurality of consecutive single append operations, the second plurality of consecutive single append operations should cause the spacing between control track pulses to progressively decrease. After the second plurality of consecutive single append operations is complete, another normal write operation is performed to mark the end of the second plurality of consecutive single append operation.

After the aforementioned appending operations and normal write operations are complete, the linear velocity of the magnetic tape 20 is monitored when the format section, the first plurality of consecutive single appends, the data associated with the first normal write operation, the second plurality of consecutive single appends, and the final normal write operation are read. The resulting velocity profile is graphically illustrated in FIG. 9. The velocity of the magnetic tape 20 associated with the format section is identified as a first section 78 in FIG. 9. Similarly, the velocity of the magnetic tape 20 associated with the first plurality of single append operations, the first normal write operation, the second plurality of consecutive single appends and the second normal write operation are identified, respectively, as sections 80, 82, 84, and 86. As section 80 of FIG. 9 illustrates, the first plurality of consecutive single append operations results in an increasing velocity of the magnetic tape, which means that the control track spacing is increasing. Similarly, the second plurality of single append operations results in a decreasing linear velocity for the magnetic tape, which indicates that the control track spacing is progressively decreasing. The slope of a first line 88 represents the average acceleration that the magnetic tape 20 experiences when the delay less than the rough estimate was utilized. Similarly, the slope of a second line 90 indicates the deceleration experienced by the magnetic tape 20 when the delay greater then the rough estimate was used. As graphically illustrated in FIG. 10, the acceleration associated with the first delay and the acceleration associated with the second delay can be used to determine the linear relationship between the delay used during an append operation and the velocity of the magnetic tape 20 when the appended data is subsequently read. This linear relationship can be represented by the following equation:

$$y = ax + b \quad (1)$$

where y represents the acceleration, x represents the delay, a represents the slope of the line, and b represents the Y-intercept. The delay at which zero acceleration occurs is the desired total delay $D_T$. This delay can be determined by solving the above equation for the case where Y=0. This occurs at the point represented by the following equation:

$$x = -b/a \quad (2)$$

As previously mentioned, this value for the total delay $D_T$ is presently accurate to within approximately +5% of the actual total delay. Due to this slight inaccuracy, "creep" can result. However, as previously mentioned, this can be compensated for using the velocity control circuit 76.

Several variations of the present invention are believed to be possible. For example, it is believed that information that is comparable to the control track information could be established in the swipes and thereby avoid the use of a control track. It is also believed that the teachings of the present invention can be applied to the scanner servo and associated apparatus. Yet a further variation would involve resetting the codewheel pulse counter upon detecting the last control track pulse or comparable signal and then aligning the PG signal with the reference signal. The viability of this approach apparently decreases as the tolerance of the helical scan recording system for deviations from the nominal spacing between consecutive swipes decreases. It is further believed that the teachings of the present invention could be implemented using analog devices to replace some or all of the digital circuitry discussed hereinabove. Moreover, it is believed that combinations of two or more of these variations are also feasible.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The embodiment described hereinabove is further intended to explain the best mode known of practicing the invention and to enable others skilled in the art to utilize the invention in the various embodiments and with the various modifications required by their particular applications or uses of the invention. It is intended that the appended claims be construed to include alternate embodiments to the extent permitted by the prior art.

What is claimed is:

1. A method for appending data to data that has been previously written on a record carrier where the spacing between the previously written data and the appended data is substantially within a defined range, comprising the steps of:

providing a record carrier;

providing means for writing data on said record carrier, said means for writing having a first delay between the time the writing of data on the record carrier is initiated and the time the data is actually written on said record carrier;

providing means for reading data written on said record carrier, said means for reading having a second delay between the time the reading of data on said record carrier is initiated and the time the data is actually detected;

providing a periodic reference signal having a defined cycle time;

defining a reference point in said cycle of said reference signal;

providing a total delay that is an estimate of said first delay plus said second delay;

providing means for controlling the movement of said record carrier relative to said means for writing and said means for reading, said means for controlling providing a first signal representative of the velocity of said record carrier relative to said means for writing and said means for reading;

writing at least two consecutive individual data on said record carrier by using said means for controlling to move said record carrier at a substantially constant velocity relative to said means for writing and providing said at least two individual data to said means for writing at substantially the same instant relative to said reference point of said periodic reference signal, wherein a first space that is within a defined range is established between said at least two individual data;

reading said at least two consecutive individual data established on said record carrier using said means for controlling to move said record carrier at a substantially constant velocity relative to said means for reading, wherein said step of reading includes establishing a first phase difference between said reference point on said periodic reference signal and the data actually detected by said means for reading that is substantially equal to said total delay;

writing at least one individual data on said record carrier following said at least two consecutive individual data previously written on said record carrier, wherein said means for controlling maintains said first phase difference between said reference point on said periodic reference signal and the data actually detected by said means for reading by maintaining a second phase difference between said reference point on said periodic reference signal and said first signal to establish a second space between said at least one individual data and said at least two individual data that is within a defined range.

2. A method, as claimed in claim 1, wherein:
said record carrier includes a tape having a longitudinal axis.

3. A method, as claimed in claim 2, wherein:
at least one of said means for writing data and said means for reading data traverses the tape at an angle to said longitudinal axis of the tape.

4. A method, as claimed in claim 1, wherein:
said step of reading includes using said first signal to correct for inaccuracy in said total delay that results in the velocity of said record carrier relative to said means for writing and said means for reading being other than a nominal velocity and thereby affecting the length of said second space.

5. A method for use in measuring the total delay associated with writing data on and reading data from a record carrier, comprising:
providing a record carrier;
providing read/write means for reading data from and writing data on said record carrier;
providing means for controlling the movement of one of said record carrier and said read/write means relative to the other using a reference signal and a signal representative of the movement of one of said record carrier and said read/write means relative to the other, said means for controlling having a transient response time;
wherein said means for controlling and said read/write means are capable of writing said individual data on said record carrier with substantially constant spacing between said individual data providing individual data are provided within a defined time of one another;

writing a first plurality of data on said record carrier using a first phase difference between said reference signal and said signal representative of movement, wherein at least two consecutive individual data are provided outside said defined time of one another and are written on said record carrier in less time than said transient response time;

reading said first plurality of data on said record carrier using said read/write means and said means for controlling;

measuring, during said step of reading said first plurality of data, a first parameter representative of the rate of change of velocity of at least one of said record carrier and said read/write means relative to the other;

writing a second plurality of data on said record data using a second phase difference between said reference signal and said signal representative of movement, wherein at least two consecutive individual data are provided outside said defined time of one another and are written on said record carrier in less time than said transient response time;

reading said second plurality of data on said record carrier using said read/write means and said means for controlling;

measuring, during said step of reading said second plurality of data, a second parameter representative of the rate of change of velocity of at least one of said record carrier and said read/write means relative to the other; and using said first phase difference, said first parameter, said second phase difference, and said second parameter to determine the total delay.

6. A method, as claimed in claim 5, further including:
estimating the total delay prior to said steps of writing a first plurality of data on said record carrier using a first delay and writing a second plurality of data on said record carrier using a second delay.

7. A method, as claimed in claim 6, wherein:
said first delay is greater than said estimated delay and said second delay is less than said estimated delay.

8. A method, as claimed in claim 5, further including:
writing a third plurality of data on said record carrier, wherein each of said third plurality of data are provided within a defined time of one another and the total time necessary to write said third plurality of data is greater than said transient response time, wherein said third plurality of data are written on said record carrier at one of the following locations: preceding both said first plurality of data and said second plurality of data, between said first plurality of data and said second plurality of data, and following said first plurality of data and said plurality of data.

9. A method, as claimed in claim 5, wherein:
said step of using includes determining the total delay at which the change in velocity would be substantially zero.

10. A method for use in measuring the total delay in a data recording system that is associated with writing data on and reading data from a record carrier, said method comprising the steps of:
providing a record carrier;
providing read/write means for use in reading data from and writing data on said record carrier;
providing means for moving at least one of said record carrier and said read/write means relative to the other;

providing means for controlling the movement of one of said record carrier and said read/write means relative to the other, wherein said means for controlling includes means for use in maintaining a defined delay between a reference signal and a signal representative of the movement of one of said record carrier and said read/write means relative to the other;

determining, using said record carrier, said read/write means, said means for use in moving, and said means for controlling, the relationship between the delay used to write data on the record carrier and one of the following: the change in velocity of one of said record carrier and said read/write means relative to the other during the reading of data on said record carrier, and the change in spacing between data on said record carrier during the reading of data on said record carrier; and using the relationship to determine a delay at which one of the following: the velocity remains substantially constant during the reading of data established on the record carrier and the spacing between data established on the record carrier remains substantially constant, wherein said delay is a measure of the total delay associated with writing data on and reading data from a record carrier and can be used to append data on the record carrier to data previously established on said record carrier.

11. A method, as claimed in claim 10, wherein:
said step of determining includes estimating a delay at which one of the following: the velocity of one of said record carrier and said read/write means relative to the other remains substantially constant during the reading of data established on the record carrier, and the spacing between data established on the record carrier remains substantially constant during the reading of data on the record carrier.

12. A method, as claimed in claim 10, wherein:
said relationship can be modeled as a substantially linear relationship.

13. A method, as claimed in claim 12, wherein:
said step of determining includes determining at least two points of said linear relationship.

14. A method, as claimed in claim 10, wherein said step of determining includes:
writing a first plurality of data on said record carrier using a first phase difference between said reference signal and said signal representative of movement, wherein at least two consecutive data are provided outside a defined time of one another and are written on said record carrier in less time than a transient response time associated with said means for controlling;

writing a second plurality of data on said record carrier using a second phase difference between said reference signal and said signal representative of movement, wherein at least two consecutive data are provided outside said defined time of one another and are written on said record carrier in less time than said transient response time;

reading said first plurality of data on said record carrier using said read/write means and said means for controlling;

measuring, during said step of reading said first plurality of data, a first parameter representative of the rate of change in velocity of at least one of said record carrier and said read/write means relative to the other;

reading said second plurality of data on said record carrier using said read/write means and said means for controlling;

measuring, during said step of reading said second plurality of data, a second parameter representative of the rate of change in velocity of at least one of said record carrier and said read/write means relative to the other.

15. A method for appending data to data that has been previously established on a tape by a helical scan tape recorder where the spacing between the data previously established on the tape and the appended data is substantially within a defined range, said method comprising the steps of:

providing a tape;

providing means for writing data on said tape, said means for writing having a first delay between the time the writing of data on said tape is initiated and the time the data is actually written on said tape;

providing means for reading data that has been written on said tape, said means for reading having a second delay between the time the reading of data on said tape is initiated and the time the data is actually detected;

providing means for moving at least one of said tape and said means for writing relative to the other;

controlling the movement of one of said tape and said means for writing relative to the other, wherein data can be appended to data previously established on said tape using said means for writing such that the spacing between the data previously established on the tape and the data appended is within a defined range, said step of controlling includes establishing a phase difference between a reference signal and a signal representative of the position of one of said tape and said means for writing relative to the other that is related to a sum of said first delay and said second delay.

16. A method, as claimed in claim 15, wherein:
said step of controlling includes rewinding said tape and using said means for reading to read at least two consecutive data previously established on said tape by a prior write operation that has terminated before appending any data to data previously established on said tape, wherein the spacing between said at least two consecutive data is within said defined range of the spacing between the data previously established on the tape and the appended data.

17. A method for appending data to data that has been previously established on a record carrier where the spacing between the data previously established on the record carrier and the appended data is substantially within a defined range, said method comprising the steps of:

providing a record carrier;

providing means for writing data on said record carrier, said means for writing having a first delay between the time the writing of data on said record carrier is initiated and the time the data is actually written on said record carrier;

providing means for reading data that has been written on said record carrier, said means for reading having a second delay between the time the reading of data on said record carrier is initiated and the time the data is actually detected;

providing means for moving at least one of said record carrier and said means for writing relative to the other;

controlling the movement of one of said record carrier and said means for writing relative to the other, wherein data can be appended to data previously established on said record carrier using said means for writing such that the spacing between the data previously established on the record carrier and the data appended is within a defined range, said step of controlling includes establishing a phase difference between a reference signal and a signal representative of the position of one of said record carrier and said means for writing relative to the other that is related to a sum of said first delay and said second delay, said signal representative of the position of one of said record carrier and said means for writing relative to the other is derived from said record carrier.

18. A method for appending data to data that has been previously established on a record carrier where the spacing between the data previously established on the record carrier and the appended data is substantially within a defined range, said method comprising the steps of:

providing a record carrier;

providing means for writing data on said record carrier, said means for writing having a first delay between the time the writing of data on said record carrier is initiated and the time the data is actually written on said record carrier;

providing means for reading data that has been written on said record carrier, said means for reading having a second delay between the time the reading of data on said record carrier is initiated and the time the data is actually detected;

providing means for moving at least one of said record carrier and said means for writing relative to the other;

controlling the movement of one of said record carrier and said means for writing relative to the other, wherein data can be appended to data previously established on said record carrier using said means for writing such that the spacing between the data previously established on the record carrier and the data appended is within a defined range, said step of controlling includes establishing a phase difference between a reference signal and a signal representative of the position of one of said record carrier and said means for writing relative to the other that is related to a sum of said first delay and said second delay, said signal representative of the position of one of said record carrier and said means for writing relative to the other is related to said means for moving at least one of said record carrier and said means for writing relative to the other.

19. A method for appending data to data that has been previously established on a record carrier where the spacing between the data previously established on the record carrier and the appended data is substantially within a defined range, said method comprising the steps of:

providing a record carrier;

providing means for writing data on said record carrier, said means for writing having a first delay between the time the writing of data on said record carrier is initiated and the time the data is actually written on said record carrier;

providing means for reading data that has been written on said record carrier, said means for reading having a second delay between the time the reading of data on said record carrier is initiated and the time the data is actually detected;

providing means for moving at least one of said record carrier and said means for writing relative to the other;

controlling the movement of one of said record carrier and said means for writing relative to the other, wherein data can be appended to data previously established on said record carrier using said means for writing such that the spacing between the data previously established on the record carrier and the data appended is within a defined range, said step of controlling includes establishing a phase difference between a reference signal and a signal representative of the position of one of said record carrier and said means for writing relative to the other that is related to a sum of said first delay and said second delay, said step of controlling includes correcting for inaccuracy in said phase difference.

20. A helical scan tape recorder for use in appending data to data previously established on a tape where the spacing between the appended data and the data previously established on the tape is substantially within a defined range, said helical scan tape recorder comprising:

means for writing data on the tape, said means for writing having a first delay between the time that the writing of data on the tape is initiated and the time that data is actually written on the tape;

means for reading data that has been written on the tape, said means for reading having a second delay between the time that the reading of data on the tape is initiated and the time that the data is actually detected;

means for moving at least one of said means for writing and the tape relative to the other; and means for controlling the movement of one of the tape and the means for writing relative to the other, wherein data that is appended to data previously established on the tape is written at a spacing from the data previously established on the tape that is within a defined range, said means for controlling includes means for use in maintaining a phase difference between a reference signal and a signal representative of the position of the tape that is related to the sum of the first delay and the second delay.

21. A helical scan tape recorder, as claimed in claim 20, wherein;

said signal representative of the position of the tape is derived from data established on the tape prior to the appending of data.

22. A helical scan tape recorder, as claimed in claim 20, wherein:

said signal representative of the position of the tape is derived from said means for moving.

23. A helical scan tape recorder, as claimed in claim 20, wherein:

said means for controlling includes means for adjusting said phase difference.

24. A method for appending data to data that has been previously established on a record carrier where the spacing between the data previously established on the record carrier and the appended data is substantially within a defined range, said method comprising the steps of:

provided a record carrier;

providing means for writing data on said record carrier, said means for writing having a first delay between the time the writing of data on said record carrier is initiated and the time the data is actually written on said record carrier;

providing means for reading data that has been written on said record carrier, said means for reading having a second delay between the time the reading of data on said record carrier is initiated and the time the data is actually detected;

providing means for moving at least one of said record carrier and said means for writing relative to the other;

providing means for controlling the movement of one of said record carrier and said read/write means relative to the other, wherein said means for controlling includes means for use in maintaining a defined delay between a reference signal and a signal representative of the movement of one of said record carrier and said read/write means relative to the other;

determining the relationship between the delay used to write data on the record carrier and one of the following: the change in velocity of one of said record carrier and said read/write means relative to the other and, the change in spacing between data on said record carrier during the reading of data on said record carrier using said record carrier, said read/write means, said means for use in moving, and said means for use in controlling;

using the relationship to determine a delay at which one of the following: the velocity remains substantially constant during the reading of data established on the record carrier and the spacing between data established on the record carrier remains substantially constant, wherein said delay is a measure of the total delay associated with writing data on and reading data from a record carrier and can be used to append data on the record carrier to data previously established on said record carrier; and controlling the movement of one of said record carrier and said write means relative to the other using said means for reading, wherein data can be appended to data previously established on said record carrier using said means for writing such that the spacing between the data previously established on the record carrier and the data appended is within a defined range.

* * * * *